(No Model.)

E. L. PERRY.
HOSE OR TUBING.

No. 289,854.   Patented Dec. 11, 1883.

WITNESSES
F. L. Durand
N. E. Oliphant

INVENTOR
Edward L. Perry
per Chas. H. Fowler
Attorney

United States Patent Office.

EDWARD L. PERRY, OF PATERSON, NEW JERSEY.

HOSE OR TUBING.

SPECIFICATION forming part of Letters Patent No. 289,854, dated December 11, 1883.

Application filed May 15, 1883. (No model.)

*To all whom it may concern:*

Be it known that I, EDWARD L. PERRY, a citizen of the United States, residing at Paterson, in the county of Passaic and State of New Jersey, have invented certain new and useful Improvements in Hose or Tubing; and I do hereby declare that the following is a full, clear, and exact description of the same, reference being had to the annexed drawings, making a part of this specification, and to the letters and figures of reference marked thereon.

Figure 1:
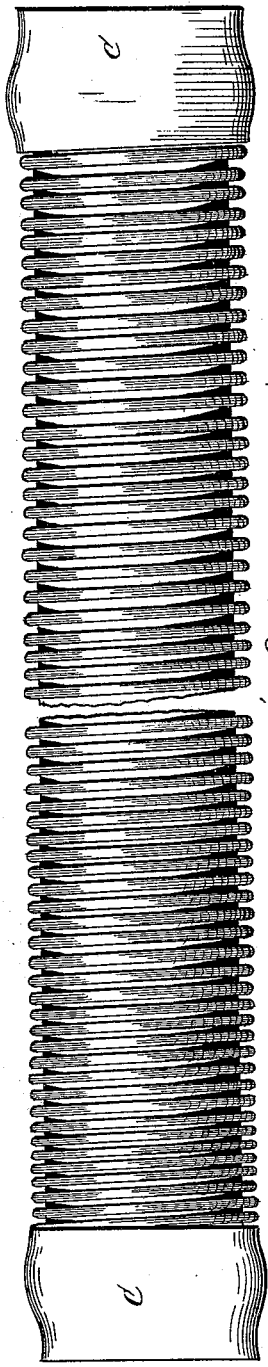
Figure 2:
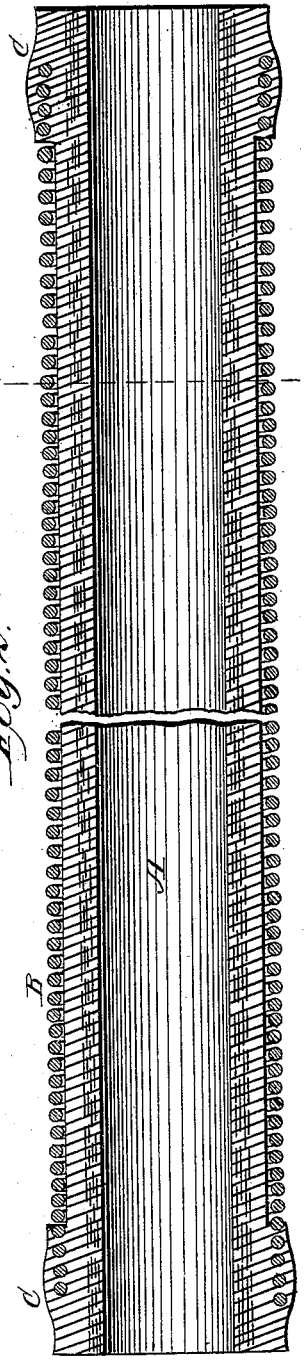
Figure 3:
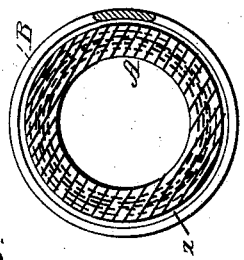

Figure 1 of the drawings is a side elevation, Fig. 2 a longitudinal vertical section, and Fig. 3 a cross-section, of my invention.

The present invention has relation to that class of flexible tubing provided upon its exterior with a coil of wire or a wire armor consisting of helices interlacing each other, the principal object being to strengthen the tubing and prevent it from becoming flattened at the point where bent. These armors or coverings, although of a sufficient size to slide over the tubing, yet come in close contact with the exterior surface thereof, and when the tube expanded by the pressure of water or steam passing through it the surface of the tubing would press with such force against the wire as to render the wire liable to cut into it, and by continued use the tubing would become useless or leaky.

It is the object of my invention to remove as far as possible the above-mentioned difficulties; and it consists in a covering composed of an open loose coil formed from a continuous wire placed around the hose or tubing, its inner circumference being sufficiently greater than the outer circumference of the tubing to leave a space between it and the wire coil, so as to provide room for the expansion of the tubing without cutting into the wire coils.

The invention further consists in attaching the ends of the wire coil to the tubing to hold it in place, as hereinafter described.

In the accompanying drawings, A represents a section of hose consisting of rubber and plies of fibrous material arranged together in the ordinary manner, over which is placed a coil of galvanized iron or other suitable wire, B, of a diameter greater than that of the exterior of the hose around which it is placed, so as to leave a space, *a*, between said hose and the wire composing the coil. After this loose coil of wire has been placed upon the hose, I prefer to cover the ends with a material, C, similar to that composing said hose, and subject the same to a heat just sufficient to vulcanize the rubber thus put on the ends, to hold the coil in place and at the same time give a finish to said ends.

Though I have described the above as the most preferable manner of securing the ends of the coil to the hose or tubing, other means may be employed for effecting the same purpose.

It will be seen from the above construction that when steam, air, or fluid is let into the hose the plies of fibrous material take the first strain and hold it until the pressure becomes strong enough to expand said hose to fill the space between it and the coil placed thereon, after which the said coil prevents further expansion, this being a matter of great importance when the hose is used for steam, pneumatic, or hydraulic purposes, wherein the pressure is strong and heavy.

When the hose is used for light pressure—such as air-brakes, or light steam and suction, where great flexibility is requisite—the coil, being of a larger diameter than said hose and of a true circle, prevents the hose from collapsing under vacuum, and also protects the same from wear by chafing or cutting, and at the same time gives the hose the same flexibility it would have without the coil.

Having now fully described my invention, what I claim as new, and desire to secure by Letters Patent, is—

1. A hose or tubing provided with a covering consisting of an open loose spiral coil formed from a continuous wire, and having an internal diameter sufficiently larger than the external diameter of said hose or tubing to form a space between the two, said coil having its ends suitably secured to the hose or tubing, substantially as and for the purpose set forth.

2. A hose or tubing provided with a covering consisting of an open continuous coil of wire greater in its internal diameter than the external diameter of the hose or tubing, to provide a space between it and the continuous wire coil, the ends of said coil being fastened to the hose or tubing by a material similar to that composing the same, placed thereon and vulcanized, substantially as shown and described.

In testimony that I claim the above I have hereunto subscribed my name in the presence of two witnesses.

EDWARD L. PERRY.

Witnesses:
W. C. WITTER,
H. S. WINANS.